(12) United States Patent  
Gavillet

(10) Patent No.: US 9,086,482 B2
(45) Date of Patent: Jul. 21, 2015

(54) METHOD FOR DETERMINING THE NAVIGATION SPEED OF A CARRIER AND HYBRIDIZATION DEVICE

(75) Inventor: Simon Gavillet, Paris (FR)

(73) Assignee: SAGEM DEFENSE SECURITE, Paris (FR)

( * ) Notice: Subject to any disclaimer, the term of this patent is extended or adjusted under 35 U.S.C. 154(b) by 550 days.

(21) Appl. No.: 13/394,326

(22) PCT Filed: Sep. 8, 2010

(86) PCT No.: PCT/EP2010/063172
§ 371 (c)(1),
(2), (4) Date: May 14, 2012

(87) PCT Pub. No.: WO2011/029844
PCT Pub. Date: Mar. 17, 2011

(65) Prior Publication Data
US 2012/0229326 A1   Sep. 13, 2012

(30) Foreign Application Priority Data

Sep. 8, 2009   (FR) ..................................... 09 56106

(51) Int. Cl.
*G01S 13/58*   (2006.01)
*G01S 13/60*   (2006.01)
*G01C 21/16*   (2006.01)
*G01S 13/86*   (2006.01)

(52) U.S. Cl.
CPC ............... *G01S 13/60* (2013.01); *G01C 21/165* (2013.01); *G01S 13/86* (2013.01)

(58) Field of Classification Search
CPC ........ G01S 13/58; G01S 13/60; G01C 21/165
USPC ....................................................... 342/106
See application file for complete search history.

(56) References Cited

U.S. PATENT DOCUMENTS 3,702,477 A * 11/1972 Brown .......................... 342/451
5,787,384 A *  7/1998 Johnson ........................ 701/472
(Continued)

FOREIGN PATENT DOCUMENTS

EP           0838 692          4/1998

OTHER PUBLICATIONS

Bernard A Kriegsman Radar updated Inertial Navigation of a Continuously Powered Space Vehicle IEEE Transactions on Aerospace and electronic Syslems Jul. 1, 1966, pp. 549-565, 19565, vol. AES-2, No. 4 IEEE Service Center Piscataway NJ US.*

(Continued)

*Primary Examiner* — Timothy A Brainard
(74) *Attorney, Agent, or Firm* — Blakely Sokoloff Taylor & Zafman

(57) ABSTRACT

The invention relates to a method for determining the navigation speed of a carrier using a hybridization device (1) including a Kalman filter (3) developing a hybrid navigation speed ($V_{ref}$) from inertial measurements calculated by a virtual platform (2) estimating a speed of the carrier (formula (I)) and frequency measurements outputted by a Doppler radar (4) having a multi-lobe antenna built therein, such that a Doppler frequency (F1, F2, F3, F4) is associated with each of the lobes, wherein said method includes the following steps: estimating, from the estimated speed (formula (I)), frequencies (F1, F2, F3, F4) corresponding to each of the Doppler frequencies (formula (II)) outputted by the radar; determining a group of observations where each observation represents an estimation deviation on the Doppler frequency associated with a lobe; calculating, by the Kalman filter (3), a speed correction ($\Delta V$) to be applied to the estimated speed (formula (I)) on the basis of the group of observations.

7 Claims, 2 Drawing Sheets

(56) References Cited

U.S. PATENT DOCUMENTS 6,415,223 B1     7/2002    Lin et al.
8,909,471 B1 *   12/2014   Jinkins et al. ................ 701/468

OTHER PUBLICATIONS

Bernard A Kriegsman, Radar-Updated Inertial Navigation of a Continuously-Powered Space Vehicle, IEEE Transactions on Aerospace and Electronic Systems, Jul. 1, 1966, pp. 549-565, vol. AES-2, No. 4, IEEE Service Center, Piscataway, NJ, U.S.

Dr. Donald R. Vanderstoep et al., A New Approach to Doppler-Inertial Navigation (Doppler Beam Sampling), 6th Asilomar Conference on Circuits and Systems, Nov. 15-17, 1972, pp. 267-275, Pacific Grove, CA, U.S.

* cited by examiner

METHOD FOR DETERMINING THE NAVIGATION SPEED OF A CARRIER AND HYBRIDIZATION DEVICE This is a non-provisional application claiming the benefit of International Application Number PCT/EP2010/063172 filed Sep. 8, 2010.

GENERAL TECHNICAL FIELD

The field of the invention is that of carriers using information supplied both by an inertial unit and by a Doppler radar.

More precisely, it relates to a method for determining a navigation speed of a carrier and a hybridization device configured to implement the method.

PRIOR ART

Carriers such as aircraft have numerous navigation systems. Included among said systems are in particular hybrid INS/Doppler radar equipment (INS signifying "Inertial Navigation System").

An inertial unit supplies low noise and precise information in the short term. However, in the long term, the localisation performances of an inertial unit deteriorate (more or less quickly depending on the quality of the sensors, accelerometers or gyroscopes for example, and the processing used by the unit). A Doppler radar makes it possible, in a known manner, to measure the speed of the carrier. The radar emits a wave in the direction of the surface flown over, and the reflected wave is detected by an antenna. The frequency difference between the emitted wave and the return wave, reflected by the surface, makes it possible to deduce the relative displacement speed of the carrier with respect to said surface.

Hybridization consists in combining the information supplied by the inertial unit and the measurements supplied by the Doppler radar to obtain speed information by taking advantage of the two systems. Thus, the precision of the measurements supplied by the Doppler radar makes it possible to control the inertial deviation.

Such hybridization is generally carried out using a Kalman filter.

To determine a speed vector of the carrier in space, the Doppler radar includes two antennas, one for transmission, the other for reception, each provided with a given number of lobes (generally 4) along a specific orientation.

In FIG. 1 is represented the orientation of the four lobes of an antenna of a Doppler radar. One of the lobes, referenced L4, is oriented with respect to a reference frame linked to the Doppler radar as a function of the angles $\varnothing$, $\theta$ and a summit S on the vertical axis (Oz axis) of the reference frame, identified by a third angle $\psi$. The three other beams L1, L2, L3 are symmetrical to L4 respectively with respect to the axis Oz, to the plane yOz and to the plane xOz. The lobes L1, L2, L3 L4 of the reception antenna thus each detect a return wave, the frequency F1, F2, F3, F4 of which may be measured.

The relation between the Doppler frequencies Fi, each corresponding to a lobe Li of the antenna and the speed of the carrier in the reference frame d linked to the Doppler radar— the axes of which are represented in FIG. 1—is expressed in matrix form by the following physical model:

$$\begin{pmatrix} F1 \\ F2 \\ F3 \\ F4 \end{pmatrix} = \frac{2F_t}{c} \begin{bmatrix} -\sin\theta & -\cos\theta\sin\phi & \cos\theta\cos\phi \\ -\sin\theta & \cos\theta\sin\phi & \cos\theta\cos\phi \\ \sin\theta & -\cos\theta\sin\phi & \cos\theta\cos\phi \\ \sin\theta & \cos\theta\sin\phi & \cos\theta\cos\phi \end{bmatrix} \cdot \begin{pmatrix} V_x \\ V_y \\ V_z \end{pmatrix} + \begin{pmatrix} \varepsilon 1 \\ \varepsilon 2 \\ \varepsilon 3 \\ \varepsilon 4 \end{pmatrix}$$

where $V_x$, $V_y$ and $V_z$ represent the speed vector V of the carrier projected onto the axes of the reference frame, $F_t$ is the frequency of the emitted wave and c is the speed of light. The $\varepsilon$ represent the errors—independent—linked to the Doppler frequency measurements.

Hereafter, the matrix will be noted K:

$$\frac{2F_t}{c} \begin{bmatrix} -\sin\theta & -\cos\theta\sin\phi & \cos\theta\cos\phi \\ -\sin\theta & \cos\theta\sin\phi & \cos\theta\cos\phi \\ \sin\theta & -\cos\theta\sin\phi & \cos\theta\cos\phi \\ \sin\theta & \cos\theta\sin\phi & \cos\theta\cos\phi \end{bmatrix},$$

The preceding equation being re-written:

$$\begin{pmatrix} F1 \\ F2 \\ F3 \\ F4 \end{pmatrix} = K \cdot \begin{pmatrix} V_x \\ V_y \\ V_z \end{pmatrix} + \begin{pmatrix} \varepsilon 1 \\ \varepsilon 2 \\ \varepsilon 3 \\ \varepsilon 4 \end{pmatrix} \quad (1)$$

The speed is generally developed from three frequency measurements. Conventionally, the measurements are carried out sequentially (every 50 ms for example) and the 3 most recent measurements are then considered.

For example, the speed vector can be determined, to the nearest error, by the relation:

$$\begin{pmatrix} V_x \\ V_y \\ V_z \end{pmatrix} = \frac{c}{2F_t} \begin{bmatrix} -\sin\theta & -\cos\theta\sin\phi & \cos\theta\cos\phi \\ -\sin\theta & \cos\theta\sin\phi & \cos\theta\cos\phi \\ \sin\theta & -\cos\theta\sin\phi & \cos\theta\cos\phi \end{bmatrix}^{-1} \cdot \begin{pmatrix} F1 \\ F2 \\ F3 \end{pmatrix}$$

This speed may sometimes then be filtered in order to optimise the noise and delay compromise. The error on the speed thereby determined thus stems from a mixing between the errors on three different frequency measurements. A complex error model that is not optimised to be used in a Kalman filter ensues. This limits the performances of hybridization by the Kalman filter.

In practice, INS/Doppler hybridization may be used in support of conventional hybridizations between an INS and a global navigation satellite system (GNSS), in the case where satellite measurements are no longer available. This hybridization is efficient above a stable surface such as the ground, but its performance drops off above a dynamic surface such as the sea and necessitates having to model marine current phenomena. Indeed, an important error is then associated with each measurement of frequencies. This error is found in the complex error model of the speed determined by the Doppler radar, which limits the precision of the speed corrected by the Kalman filter via the hybridization with the data from the inertial unit.

The article "Radar-Updated Inertial Navigation of a Continuously-Powered Space Vehicle" by Bernard A. Kriegsman (IEEE Transactions on Aerospace and Electronics System, IEEE Service Center, Piscataway, N.J., US, vol. AES-2, no 4, 1 Jul. 1966 (1966-07-01), pages 549-565, XP011211599 ISSN:0018-9251) is representative of this prior art according to which hybridization is carried out from an estimation deviation on the speed. This article proposes more precisely balancing out the difference between the quantity measured by the Doppler radar (namely the speed of the vehicle with respect to the surface of the Moon) and an estimation of this speed extrapolated from inertial measurements.

This article thus does not in any way propose using directly the frequency measurements of the Doppler radar to hybridize to the inertial unit. In particular, it does not propose using the speed extrapolated from inertial measurements to estimate frequencies corresponding to each of the Doppler frequencies outputted by the radar. And, a fortiori, it does not propose carrying out hybridization from an estimation deviation on the Doppler frequency associated with each of the lobes of the radar.

DESCRIPTION OF THE INVENTION

The aim of the invention is to improve INS/Doppler hybridization performance.

To this end, the invention proposes according to a first aspect a method for determining a navigation speed of a carrier using a hybridization device including a Kalman filter developing a hybrid navigation speed from inertial measurements calculated by a virtual platform estimating a speed of the carrier and frequency measurements outputted by a Doppler radar having a multi-lobe antenna built therein such that a Doppler frequency is associated with each of the lobes, the method including the following steps:
  estimating, from the estimated speed, frequencies corresponding to each of the Doppler frequencies outputted by the radar,
  determining a group of observations where each observation represents an estimation deviation on the Doppler frequency associated with a lobe,
  calculating, by the Kalman filter, a speed correction to be applied to the estimated speed on the basis of the group of observations.

The method according to a first aspect of the invention is advantageously completed by the following characteristics, taken singly or in any technically possible combinations thereof:
  each observation is determined by subtraction of the Doppler frequency associated with the lobe outputted by the Doppler radar and the estimated frequency corresponding to the lobe,
  the method moreover comprises a step of pre-filtering of the group of observations before the step of calculating a speed correction by the Kalman filter,
  the method moreover comprises a step of calculating, by the Kalman filter, a model correction to be applied to a physical model linking the estimated speed to the estimated frequencies,
  the radar outputs successively the Doppler frequencies associated with each of the lobes according to a calculating period, the observations of the group of observations then being determined during successive calculation cycles.

The invention proposes according to a second aspect a hybridization device including a virtual platform outputting inertial measurements, a Doppler radar having a multi-lobe antenna built therein and outputting a Doppler frequency associated with each of the lobes, the device moreover including:
  an estimation module configured to estimate, from a speed estimated by the virtual platform, frequency estimations corresponding to each of the Doppler frequencies outputted by the radar, and a Kalman filter intended to calculate a speed correction as a function of the frequencies estimated by the estimation module and Doppler frequencies outputted by the Doppler radar.

The invention has numerous advantages.

The observations used by the Kalman filter within the scope of the invention have a simpler error model than those of the prior art; the performances and the precision of the hybridization are improved.

DESCRIPTION OF DRAWINGS

Other characteristics, aims and advantages of the invention will become clearer from the description that follows, which is purely illustrative and non limiting, and which should be read with regard to the appended drawings, among which.

DETAILED DESCRIPTION

Figure 2:
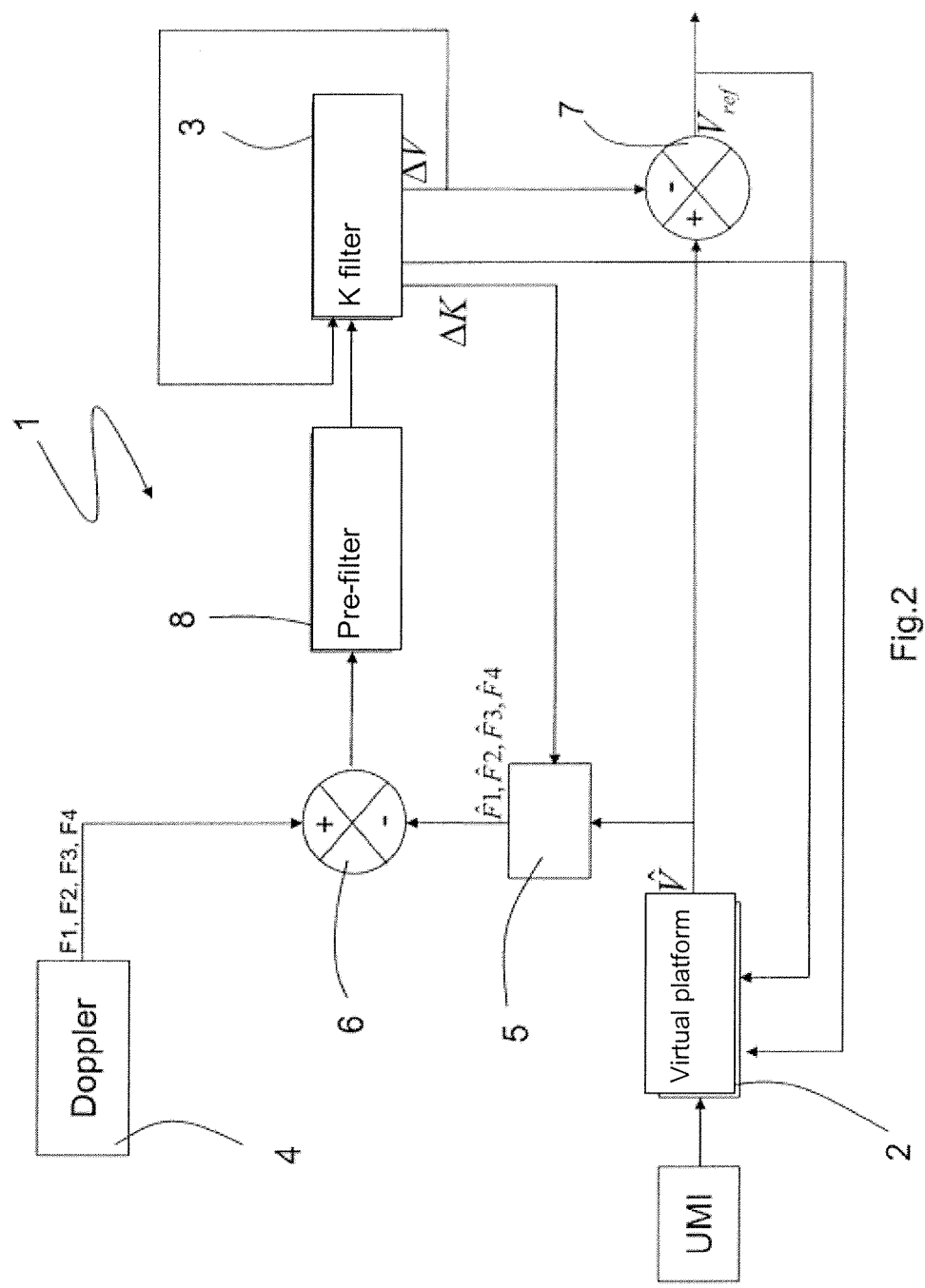
FIG. 2 represents, in the form of a block diagram, a hybridization device according to a possible embodiment of the second aspect of the invention.

With reference to FIG. 2, a hybridization device 1 has been represented according to an embodiment of the second aspect of the invention, intended to be placed on board a carrier, such as for example an aircraft. The hybridization device 1 uses information supplied by a UMI (inertial measurement unit) and by a Doppler radar 4.

A virtual platform 2 receives inertial increments from the sensors (gyroscopes, accelerometers) of the inertial unit. The inertial increments correspond in particular to angular increments and to speed increments. Inertial navigation information (such as the attitudes, speed or position of the carrier) are calculated by the virtual platform 2 from these increments. In particular, the virtual platform 2 estimates a navigation speed $\hat{V}$ of the carrier.

Figure 1:
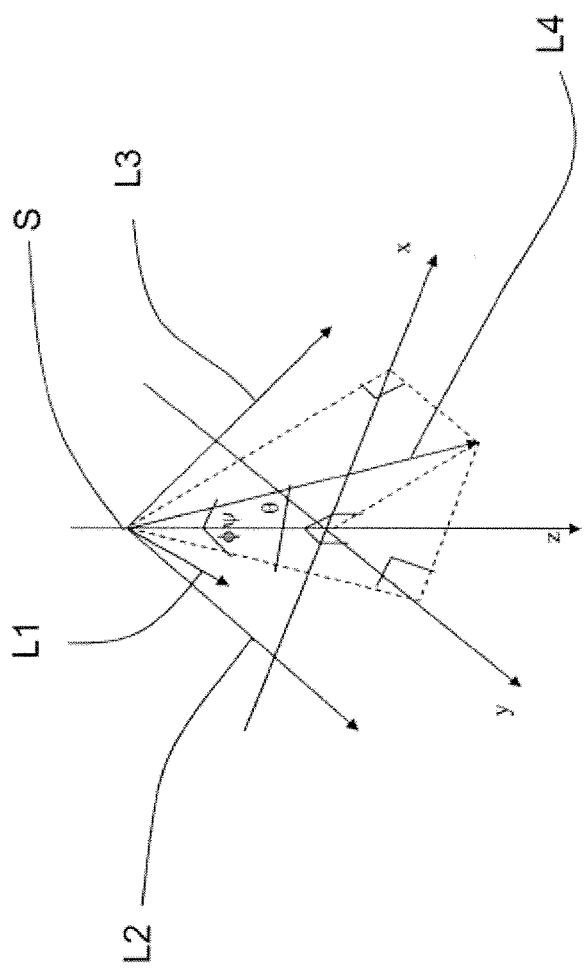
FIG. 1, already described, represents the orientation of the lobes of a receiving antenna of a Doppler radar.

The Doppler radar has a multi-lobe antenna built therein, in other words an antenna including a given number (greater than two) of lobes. Preferentially, the lobes of the antenna are four in number as represented in FIG. 1. However, the invention is not limited to this configuration, and extends to an antenna including a varied number of lobes.

The hybridization device 1 receives from the Doppler radar the frequencies F1, F2, F3, F4 associated with each of the lobes of its receiving antenna. These frequencies will be designated "Doppler frequencies" hereafter. Doppler frequencies may be outputted in the form of digital or analogical information. Doppler frequencies are calculated, for example, by a processor of the Doppler radar as a function of the waves received by the lobes of the receiving antenna of the radar.

Advantageously, the radar outputs successively the Doppler frequencies F1, F2, F3, F4 associated with each of the lobes according to a calculation period T. For example, the radar outputs firstly the frequency F1, then successively, at time interval T, the frequencies F2, F3, and F4. By way of numerical non limiting example, T can equal 0.05 s.

The hybridization device further comprises an estimation module 5 configured to estimate, from the speed estimation $\hat{V}$ supplied by the virtual platform 2, frequencies $\hat{F}1, \hat{F}2, \hat{F}3, \hat{F}4$ corresponding to each of the Doppler frequencies outputted by the radar 2.

These frequencies are estimated from a physical model linking the Doppler frequencies to the speed:

$$\begin{pmatrix} \hat{F}1 \\ \hat{F}2 \\ \hat{F}3 \\ \hat{F}4 \end{pmatrix} = \hat{K} \cdot \begin{pmatrix} \hat{V}_x \\ \hat{V}_y \\ \hat{V}_z \end{pmatrix} + \begin{pmatrix} \hat{\varepsilon}1 \\ \hat{\varepsilon}2 \\ \hat{\varepsilon}3 \\ \hat{\varepsilon}4 \end{pmatrix} \quad (2)$$

where $\hat{V}_x, \hat{V}_y$ and $\hat{V}_z$ are the projections of the speed vector $\hat{V}$ estimated by the virtual platform 2 on the axes of the reference frame linked to the Doppler radar, and $\hat{K}$ is initialised at $\hat{K}=K$ and will be advantageously corrected during the hybridization as will be seen hereafter. The $\hat{\varepsilon}$ are estimations of the errors associated with the Doppler frequency measurements. These errors could for example be estimated as independent Gaussian errors.

The hybridization device 1 moreover comprises a Kalman filter 3 carrying out the hybridization between the inertial information from the inertial unit and the information from the Doppler radar. Apart from a function of supplying statistical information on the output measurements, the role of the filter is to maintain the virtual platform 2 in a linear operating domain, image of that modelled in the Kalman filter 3 in estimating a states vector.

The Kalman filter 3 takes into account the groups of observations:

$$\begin{pmatrix} F1 - \hat{F}1 \\ F2 - \hat{F}2 \\ F3 - \hat{F}3 \\ F4 - \hat{F}4 \end{pmatrix}$$

obtained at the level of a subtractor 6 and develops a hybrid speed navigation solution.

Each of these observations represents a difference in the estimation of the Doppler frequency associated with a lobe. The first order errors associated with these observations are respectively:

$$\delta\varepsilon = \begin{pmatrix} \varepsilon 1 - \hat{\varepsilon}1 \\ \varepsilon 2 - \hat{\varepsilon}2 \\ \varepsilon 3 - \hat{\varepsilon}3 \\ \varepsilon 4 - \hat{\varepsilon}4 \end{pmatrix}$$

Within the framework of the closed loop architecture represented in FIG. 1, the hybridization device 1 develops a hybrid output Vref ("reference speed") corresponding to the speed estimated by the virtual platform 2 and corrected, via a subtractor 7, by a state vector $\Delta V$ developed by the Kalman filter.

The invention is not however limited to such an architecture, and extends in particular to an open loop architecture in which the subtractor 7 is not activated.

The hybrid output Vref may be re-looped to the input of the virtual platform 2. Furthermore, as is represented in FIG. 1, the state vector $\Delta V$ may be applied at the input of the Kalman filter 3. In this way, the filter is maintained coherent with the virtual platform 2.

Advantageously, the group of observations is pre-filtered at the level of a pre-filter 8 of the hybridization device according to the second aspect of the invention. The pre-filtering may comprise, for example, a least squares linear regression of all the observations of the group. If necessary, this pre-filtering makes it possible to reduce the noise on the input data of the Kalman filter, for better hybridization performance.

Again advantageously, the Kalman filter moreover calculates a correction to be applied to the error model of the inertial unit.

Yet again advantageously, the Kalman filter moreover calculates a correction $\Delta K$ to be made to the physical model of the estimation module 5. This correction comes down to estimating the angular characteristics in the geometry of the lobes of the antenna. The initialisation data of the matrix $\hat{K}$ may be supplied by the manufacturer of the Doppler radar but the invention also makes it possible to dispense with the knowledge of said angular data.

Thus, apart from the improved performances of the Kalman filter, the invention makes it possible to correct errors of manufacturer's data on the geometry of the receiving antenna lobes.

An implementation of calculations of estimations of frequency as a function of the speed estimated by the inertial unit will now be detailed according to a possible embodiment of the first aspect of the invention.

Hereafter, the following reference frames are defined:

b: reference frame linked to the carrier, d: reference frame linked to the Doppler radar, v: true reference frame, which is the reference frame of a perfect inertial system g: local geographic reference frame.

The quantities will be indexed on the basis of the reference frame in which they are expressed. Furthermore, for any pair of reference frames (x, y) (x, y) $T_{x/y}$ will designate the matrix of transition of the reference frame x to the reference frame y. Equation (1) is re-written in the following manner:

$$\begin{pmatrix} F1 \\ F2 \\ F3 \\ F4 \end{pmatrix} = K \cdot V_d + \begin{pmatrix} \varepsilon 1 \\ \varepsilon 2 \\ \varepsilon 3 \\ \varepsilon 4 \end{pmatrix} = K \cdot T_{d/b} \cdot [T_{b/v} \cdot V_v + \omega_b^{b/g} \wedge BL] + \begin{pmatrix} \varepsilon 1 \\ \varepsilon 2 \\ \varepsilon 3 \\ \varepsilon 4 \end{pmatrix},$$

where $\omega_b^{b/g}$ represents the rotation vector between the reference frame b and the reference frame g expressed in the reference frame b, BL represents the lever arm between the inertial unit and the Doppler radar projected into the reference frame b, and $\wedge$ represents a vectorial product.

Furthermore, equation (2), implemented by the module 5 to estimate the Doppler frequencies from the speed estimated by the inertial unit, may be re-written as follows:

$$\begin{pmatrix} \hat{F}1 \\ \hat{F}2 \\ \hat{F}3 \\ \hat{F}4 \end{pmatrix} = \hat{K} \cdot \hat{V}_v + \begin{pmatrix} \hat{\varepsilon}1 \\ \hat{\varepsilon}2 \\ \hat{\varepsilon}3 \\ \hat{\varepsilon}4 \end{pmatrix} = \hat{K} \cdot \hat{T}_{d/b} \cdot [\hat{T}_{b/v} \cdot \hat{V}_v + \omega_b^{b/g} \wedge BL] + \begin{pmatrix} \hat{\varepsilon}1 \\ \hat{\varepsilon}2 \\ \hat{\varepsilon}3 \\ \hat{\varepsilon}4 \end{pmatrix}$$

By noting $\delta K = K - \hat{K}$ and $$\delta\varepsilon = \begin{pmatrix} \varepsilon 1 \\ \varepsilon 2 \\ \varepsilon 3 \\ \varepsilon 4 \end{pmatrix} - \begin{pmatrix} \hat{\varepsilon}1 \\ \hat{\varepsilon}2 \\ \hat{\varepsilon}3 \\ \hat{\varepsilon}4 \end{pmatrix},$$

and $\delta T$: matrix of attitude errors one obtains to the first order at the input of the Kalman filter:

$$\begin{pmatrix} F1 - \hat{F}1 \\ F2 - \hat{F}2 \\ F3 - \hat{F}3 \\ F4 - \hat{F}4 \end{pmatrix} = \hat{K} \cdot T_{d/b} \cdot [\hat{T}_{b/v} \cdot (\delta T^T - I) \cdot \hat{V}_v + \hat{T}_{b/v} \cdot (V_v - \hat{V}_v)] +$$

$$\delta K \cdot T_{d/b} \cdot [\hat{T}_{b/v} \cdot \hat{V}_v + \omega_b^{b/g} \wedge BL] + \delta\varepsilon$$

One then adds to the state vectors of the system $\delta K$ and $\delta\epsilon$, which represent the errors of the Doppler radar, and in particular:

the residues of angular errors in the geometry of the lobes of the antenna, the residues of setting angles between the inertial navigation equipment and the Doppler radar, the residues of calibration errors, errors that the hybridization according to the invention makes possible to correct by the Kalman filter.

The invention claimed is:

1. Method for determining a navigation speed of a carrier by a hybridization device (1) including a Kalman filter (3) developing a hybrid navigation speed ($V_{ref}$) from inertial measurements calculated by a virtual platform (2) estimating a speed of the carrier ($\hat{V}$) and frequency measurements outputted by a Doppler radar (4) having a multi-lobe antenna built therein such that a Doppler frequency (F1, F2, F3, F4) is associated with each of the lobes, wherein said method includes the following steps:

estimating, from the estimated speed ($\hat{V}$), frequencies ($\hat{F}$1, $\hat{F}$2, $\hat{F}$3, $\hat{F}$4) corresponding to each of the Doppler frequencies (F1, F2, F3, F4) outputted by the radar, determining a group of observations where each observation represents an estimation deviation on the Doppler frequency associated with a lobe, calculating, by the Kalman filter (3), a speed correction ($\Delta V$) to be applied to the estimated speed ($\hat{V}$) on the basis of the group of observations.

2. Method according to claim 1, in which each observation is determined by subtraction of the Doppler frequency (F1, F2, F3, F4) associated with the lobe outputted by the Doppler radar and the estimated frequency ($\hat{F}$1, $\hat{F}$2, $\hat{F}$3, $\hat{F}$4) corresponding to the lobe.

3. Method according to claim 1 or claim 2, moreover including a step of pre-filtering of the group of observations before the step of calculating a speed correction by the Kalman filter (3).

4. Method according to claim 1 or claim 2, moreover including a step of calculating, by the Kalman filter (3), a model correction ($\Delta K$) to be applied to a physical model linking the estimated speed ($\hat{V}$) to the estimated frequencies ($\hat{F}$1, $\hat{F}$2, $\hat{F}$3, $\hat{F}$4).

5. Method according to claim 1 or claim 2, moreover including calculating, by the Kalman filter (3), a correction to be applied to an error model of the inertial unit.

6. Method according to claim 1 or claim 2, in which the radar outputs successively the Doppler frequencies (F1, F2, F3, F4) associated with each of the lobes according to a calculation period (T), the observations of the group of observations then being determined during successive calculation cycles.

7. Hybridization device (1) including a virtual platform (2) outputting inertial measurements, a Doppler radar (4) having a multi-lobe antenna built therein and outputting a Doppler frequency (F1, F2, F3, F4) associated with each of the lobes, wherein said device includes:

an estimation module (5) configured to estimate, from a speed estimated ($\hat{V}$) by the virtual platform (2), frequency estimations (P1, P2, P3, P4) corresponding to each of the Doppler frequencies outputted by the radar (2), and a Kalman filter (3) intended to calculate a speed correction ($\Delta V$) as a function of the frequencies estimated by the estimation module (5) and Doppler frequencies outputted by the Doppler radar.

* * * * *

UNITED STATES PATENT AND TRADEMARK OFFICE
CERTIFICATE OF CORRECTION

| | | |
|---|---|---|
| PATENT NO. | : 9,086,482 B2 | Page 1 of 1 |
| APPLICATION NO. | : 13/394326 | |
| DATED | : July 21, 2015 | |
| INVENTOR(S) | : Simon Gavillet | |

It is certified that error appears in the above-identified patent and that said Letters Patent is hereby corrected as shown below:

In the Claims, Column 8, Claim 7, at line 39, please delete "(P1, P2, P3, P4) and insert -- $(\hat{F}1, \hat{F}2, \hat{F}3, \hat{F}4)$ --.

Signed and Sealed this
Fifteenth Day of March, 2016

Michelle K. Lee
*Director of the United States Patent and Trademark Office*